(12) United States Patent
Posthuma

(10) Patent No.: US 6,496,566 B1
(45) Date of Patent: Dec. 17, 2002

(54) METALLIC TESTING OF A SUBSCRIBER LOOP THAT PROVIDES BOTH VOICE AND DIGITAL SUBSCRIBER LINE SERVICES

(75) Inventor: Carl Robert Posthuma, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 138 days.

(21) Appl. No.: 09/675,884

(22) Filed: Sep. 29, 2000

(51) Int. Cl.[7] .......................... H04M 1/24; H04M 3/08; H04M 3/22

(52) U.S. Cl. ......................... 379/22; 379/1.04; 379/9; 379/15.01; 379/27.03; 379/27.06; 379/28; 379/29.05; 370/248

(58) Field of Search .................. 379/1.01, 1.04, 379/2, 9, 9.06, 12, 15.01, 22, 22.05, 27.01, 27.03, 27.06, 28, 29.01, 29.05, 29.11; 370/241, 247, 248, 251

(56) References Cited

U.S. PATENT DOCUMENTS

| 4,791,659 | A | | 12/1988 | Ross ........................... 379/22 |
| 5,883,941 | A | * | 3/1999 | Akers ....................... 379/93.08 |
| 5,917,853 | A | * | 6/1999 | Greenblatt .................... 375/222 |
| 6,002,671 | A | * | 12/1999 | Kahkoska et al. ........... 370/248 |
| 6,181,775 | B1 | * | 1/2001 | Bella ........................... 379/29 |
| 6,215,855 | B1 | * | 4/2001 | Schneider .................... 379/22 |
| 6,266,395 | B1 | * | 7/2001 | Liu et al. ..................... 379/27 |
| 6,282,204 | B1 | * | 8/2001 | Balatoni et al. ............ 370/421 |
| 6,292,468 | B1 | * | 9/2001 | Sanderson .................. 370/241 |
| 6,292,539 | B1 | * | 9/2001 | Eichen et al. .............. 379/1.04 |
| 6,301,227 | B1 | * | 10/2001 | Antoniu et al. ............. 370/241 |
| 6,349,130 | B1 | * | 2/2002 | Posthuma et al. ......... 379/1.04 |
| 6,373,923 | B1 | * | 4/2002 | Williamson et al. ..... 379/22.01 |
| 6,385,297 | B2 | * | 5/2002 | Faulkner et al. ........... 379/1.04 |

FOREIGN PATENT DOCUMENTS

EP          1 005 209 A2       11/1999

OTHER PUBLICATIONS

Rowe, Martin, Senior Technical Editor; "ADSL Testing Moves Out of The Lab"; Test and Measurement World; (Inc. Electronics Test), Cahners Publishing, Denver, Colorado, vol. 19, No. 5, Apr. 1999, pp. 46–48, 50, 52, 54.

* cited by examiner

*Primary Examiner*—Binh Tieu

(57) ABSTRACT

Metallic testing of a subscriber loop that provides voice and DSL services is provided by a voice switch and DSL services, each of which includes a metallic test unit. A voice line card has a connection to a first metallic test bus connected to the voice switch metallic test unit via a first relay set configured to connect the metallic test bus to the subscriber loop and to disconnect the subscriber loop from the line card during testing. The DSL line card has a connection to a second metallic test bus, which is also connected to the DSLAM metallic test unit, and to the subscriber loop. A second set of relays control the connection of the metallic test bus to the line card to the subscriber loop. A signal is sent from either metallic test unit to cause the relays to change to provide a clear path for metallic testing from DC to light.

20 Claims, 4 Drawing Sheets

METALLIC TESTING OF A SUBSCRIBER LOOP THAT PROVIDES BOTH VOICE AND DIGITAL SUBSCRIBER LINE SERVICES

FIELD OF THE INVENTION

This invention relates to the field of telephone subscriber loops that provide high speed data service and voice service, and, more particularly, to metallic testing of such loops.

BACKGROUND OF THE INVENTION

A relatively new technology uses the embedded voice telephone infrastructure to provide high speed data service. This service, generally referred to as "Digital Subscriber Line"(DSL) service, is available in many markets. DSL is implemented in several different ways, such as asymmetrical DSL (ADSL where upstream and downstream have different bandwidths), symmetrical DSL (SDSL where upstream and downstream have the same bandwidth) and other varieties of services (herein "XDSL" or "DSL"). Many XDSL technologies provide high speed data service over the current tip-ring pairs by encoding high speed data signals into frequency ranges well above the frequency range that carries both plain old telephone service ("POTS") or integrated services digital network (ISDN) service. Thus, one subscriber loop comprising a tip-ring pair can provide both voice service and high speed data service.

One problem facing service providers in this fast growing market is loop maintenance. Specifically, most regulatory bodies require that each subscriber loop is tested for power cross, over-voltage, etc. as is known in the art. However, because incumbent voice service providers may be a different entity from the DSL service provider, testing the loop over the entire frequency spectrum (known in the art as "D.C. to light") requires new and relatively sophisticated and expensive equipment.

Turning now to FIG. 1, a current metallic test system is illustrated in the context of metallic testing of a subscriber loop 5. Subscriber loop 5 subscribes to both voice and DSL services. In a switching office 10, there is a voice switch 12 and a digital subscriber line access multiplexer (DSLAM) 14, which provide voice and data service for subscriber loop 5, respectively. Voice switch 12 is connected to subscriber loop 5 by line card 16 as is known in the art. Line card 16 includes processing unit 18 which sends and receives analog signals over subscriber loop 5 and processes the signals to/from pulse code modulated (PCM) data, as used in the switching network as is known in the art. DSLAM 14 includes a line card 20 which sends and receives data from loop 5 to and from the data network via transceiver 22.

Voice switch 12 and, more specifically, processing unit 18 supports analog signals in the 0–4 kHz band over subscriber loop 5. Generally, DSLAM 14, and more specifically transceiver 22 on line card 20, supports signals in the 32–1,100 kHz range over subscriber loop 5.

DSL introduces frequency and, more importantly, power characteristics that are incompatible with most current art voice service line cards. Conversely, voice service uses DC power with characteristics that interfere with DSL data. Therefore, a splitter 24 is provided in order to filter unwanted characteristics from the subscriber loop 5 for processing at processor 18 on voice line card 16 and DSL line card 20. To enhance the voice signal, splitter 24 includes low-pass filter 26, which attenuates the high voltage of DSL and generally filters out the high frequency DSL signal. To enhance the DSL signal, the DC component of signals on subscriber loop 5 are filtered by a capacitor 28 on line card 20 and a further capacitor 30 in splitter 24.

It is known in the art that voice switches include a voice switch metallic test unit 32 that tests loop 5 for various faults. Metallic test unit 32 is connected to line card 16 via metallic test bus 34. Metallic test bus 34 is connected through a set of relays 36 comprising a normally closed relay 38 and a normally open relay 40. This set of relays 30 is reversed when voice switch metallic test unit 32 tests loop 5 to protect the circuitry of processing unit 18 on line card 16. Likewise, DSLAM 14 includes DSLAM metallic test unit 42 which is connected to line card 20 via metallic test bus 44 to relays 46 including normally closed relay 48 and normally opened relay 50.

In order to effect a usable path through splitter 24 for either metallic test unit 32 or 42, several additional components must be included in splitter 24. For example, in order to test loop 5 from voice switch metallic unit 32, a signature 52 must be present in order to alert voice switch metallic unit 32 of the voltage loss that will occur because of the presence of splitter 24. If signature 52 were not present, then any estimates of broken cable etc. would be incorrect.

Further, a detector 54 needs to be added to splitter 24 in order to detect whether the voice path is currently in use. An additional detector 56 is needed to detect signals from DSLAM metallic test unit 42 which will inform processor 58 that metallic test unit 42 is going to test loop 5. When this occurs, processor 58 closes normally open relay 60 and opens normally closed relay 62 in order to permit testing from DSLAM metallic test unit 42 without interfering with line card 16 on voice switch 12. All of these additional units not only are costly but also require a power supply 64 in order to operate. All of these units also then need to be diagnosed, fused, maintained, alarmed, etc. as is known in the art.

SUMMARY OF THE INVENTION

This problem is solved and a technical advance is achieved in the art by a system and method for metallic testing of a subscriber loop that provides voice and DSL services. Voice services are provided by a voice switch and DSL services are provided by a digital subscriber line access multiplexer (DSLAM); each of which includes a metallic test unit. A voice line card in the voice switch has a connection to a first metallic test bus connected to the voice switch metallic test unit via a first set of relays configured to connect the metallic test bus to the subscriber loop and to disconnect the subscriber loop from voice on the line card when testing is performed. A DSL line in the DSLAM card has a connection to a second metallic test bus, which is connected between the DSLAM metallic test unit and the subscriber loop. A second set of relays control the connection of the metallic test bus to the subscriber loop.

In this environment, the voice switch metallic test system is configured to send signals to control the second set of relays to disconnect the DSL line card and to provide metallic tests over the entire wireline spectrum (DC to light). The DSL metallic test unit connected to the second metallic test bus is configured to send signals to control the first set of relays to disconnect the DSL line card and to provide metallic tests from DC to light. Advantageously, a determination is made whether there is traffic on either the voice line or the DSL line prior to metallic testing. The metallic test may then be run and then, for example, a timer may cause the relays to reset to their original state. Further, a detector on each of the line cards may receive out-of-band signaling from the metallic test units and cause the relays to operate.

BRIEF DESCRIPTION OF THE DRAWINGS

A more complete understanding of the invention may be obtained from a consideration of the following description, taken in conjunction with the drawings, in which.

DETAILED DESCRIPTION

Figure 1:
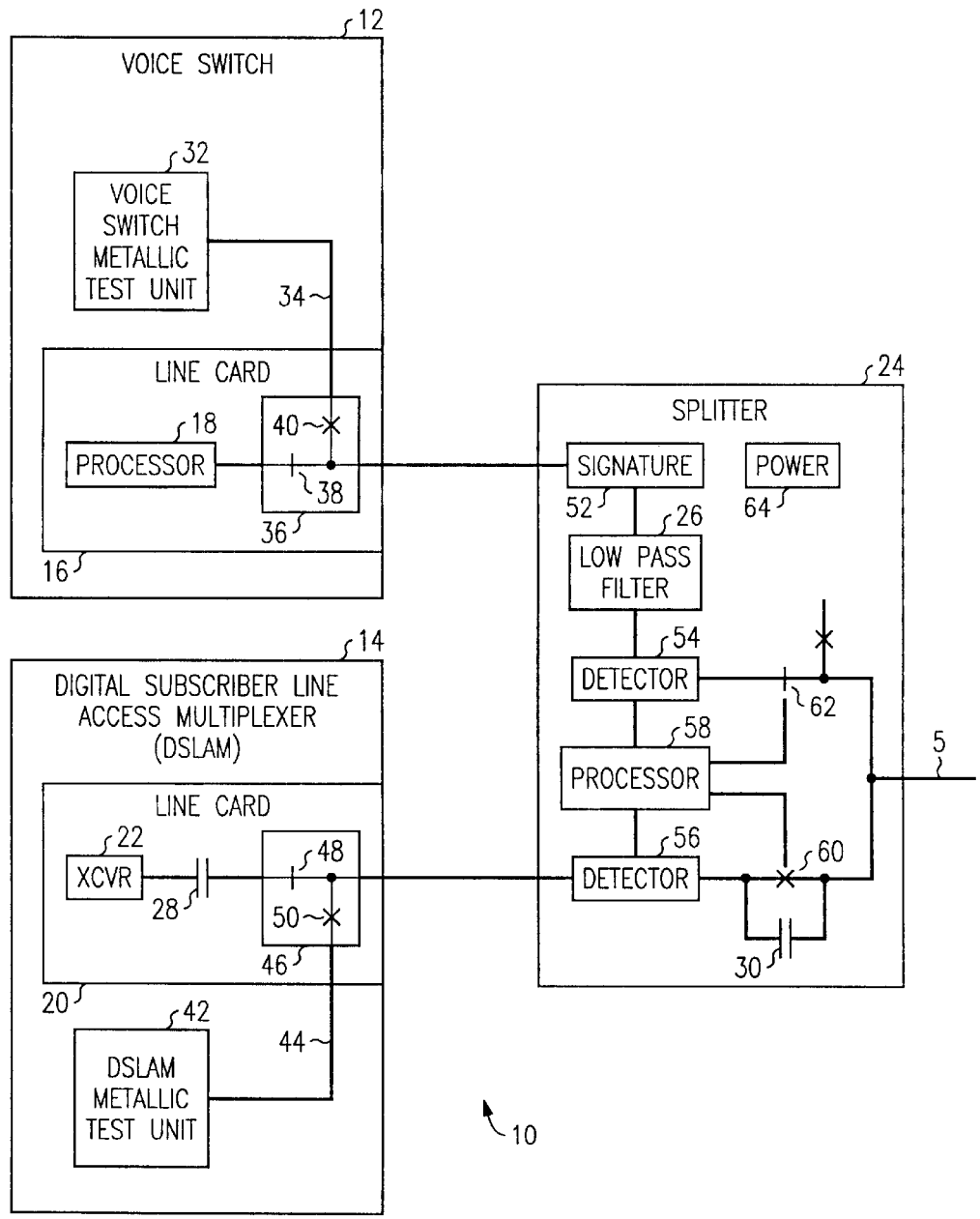
FIG. 1 is a block diagram of a prior art central office wherein XDSL is provided.
Figure 2:
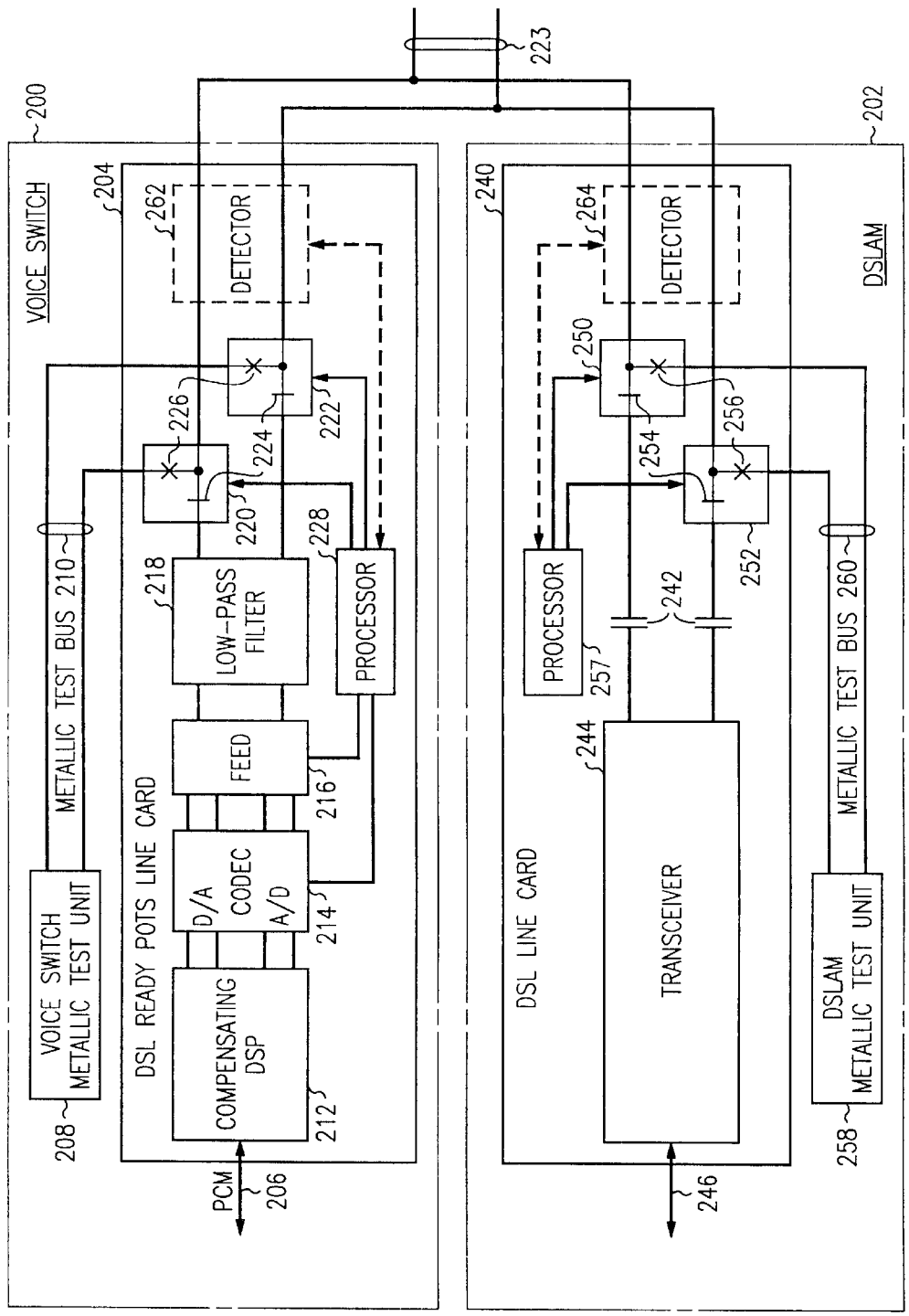
FIG. 2 is a block diagram of a system for metallic testing of a subscriber loop from both the voice switch and the DSL switch, according to an exemplary embodiment of this invention.

FIG. 2 is a block diagram of a system that effects metallic testing of a subscriber loop from both a voice switch 200 and a digital subscriber line access multiplexer (DSLAM) also called a DSL switch 202. A DSL-ready POTS line card 204 is connected to the switching core of voice switch 200 through a pulse code modulated (PCM) connection 206. DSL-ready POTS line card 204 is also connected to the voice switch 200 metallic test unit 208 via metallic test bus 210. For purposes of this description, plain old telephone service (POTS) also includes integrated services digital network (ISDN) service. Both POTS and ISDN use the same low frequency band and perform metallic testing in a similar, and in some cases, identical manner. A DSL-ready line card as described herein is more fully described in U.S. patent application No. 09/650,050 filed Aug. 28, 2000, which is incorporated herein by reference. The embodiment of the line card described herein is exemplary; it is within the ability of one skilled in the art to modify this embodiment to meet the needs of different line card configurations without departing from the scope of the claims.

DSL-ready line card 204 comprises four main components. According to this exemplary embodiment, DSL-ready line card 204 comprises a compensating digital signal processor 212, a CODEC or digital/analog, analog/digital converter 214 and a battery feed 216. In addition, a second-order, low-pass filter is included 218. For a more complete description of the functionality of POTS line card 204, see, U.S. patent application Ser. No. 09/650,050, incorporated by reference above.

Additionally, according to this invention, there are two relay pairs 220 and 222 which connect and disconnect metallic test bus to tip-ring pair 22. Each pair 220 and 222 comprises a normally closed relay 224 that normally connects tip-ring pair 22 to low-pass filter 218, and a normally open relay 226. These relays are controlled by a processor 228. When a metallic test is performed, processor 228 causes relays 224 to open and relays 226 to close, thus connecting voice switch metallic test unit 208 to tip-ring pair 22 via metallic test bus 210 (and removing the components 212, 214, 216 and 218 from the metallic test bus and loop where voltages and signals are present that could damage sensitive circuits).

XDSL line card 240 likewise sends and receives signals on tip-ring pair 22. XDSL line card 240 includes a DC blocking and low frequency filter shown as capacitors 242. Transceiver 244 sends and receives data over tip-ring pair 22 and sends and receives data from the data network over line 246 to the data network. XDSL line card 240 also includes two pair of relays 250 and 252 comprising normally closed relays 254 and normally open relays 256. As above, when a metallic test is to be run from DSLAM by metallic test unit 258 on tip-ring pair 22, processor 256 causes relays 250 and 252 to open relays 254 and close relays 256 thus connecting DSLAM metallic test unit 258 to tip-ring pair 22 via metallic test bus 260. Optionally, detectors 262 and 264 (shown in phantom) detect when either of the metallic units 208, 258 is testing as will be described further below in connection with FIGS. 3 and 4.

Figure 3:
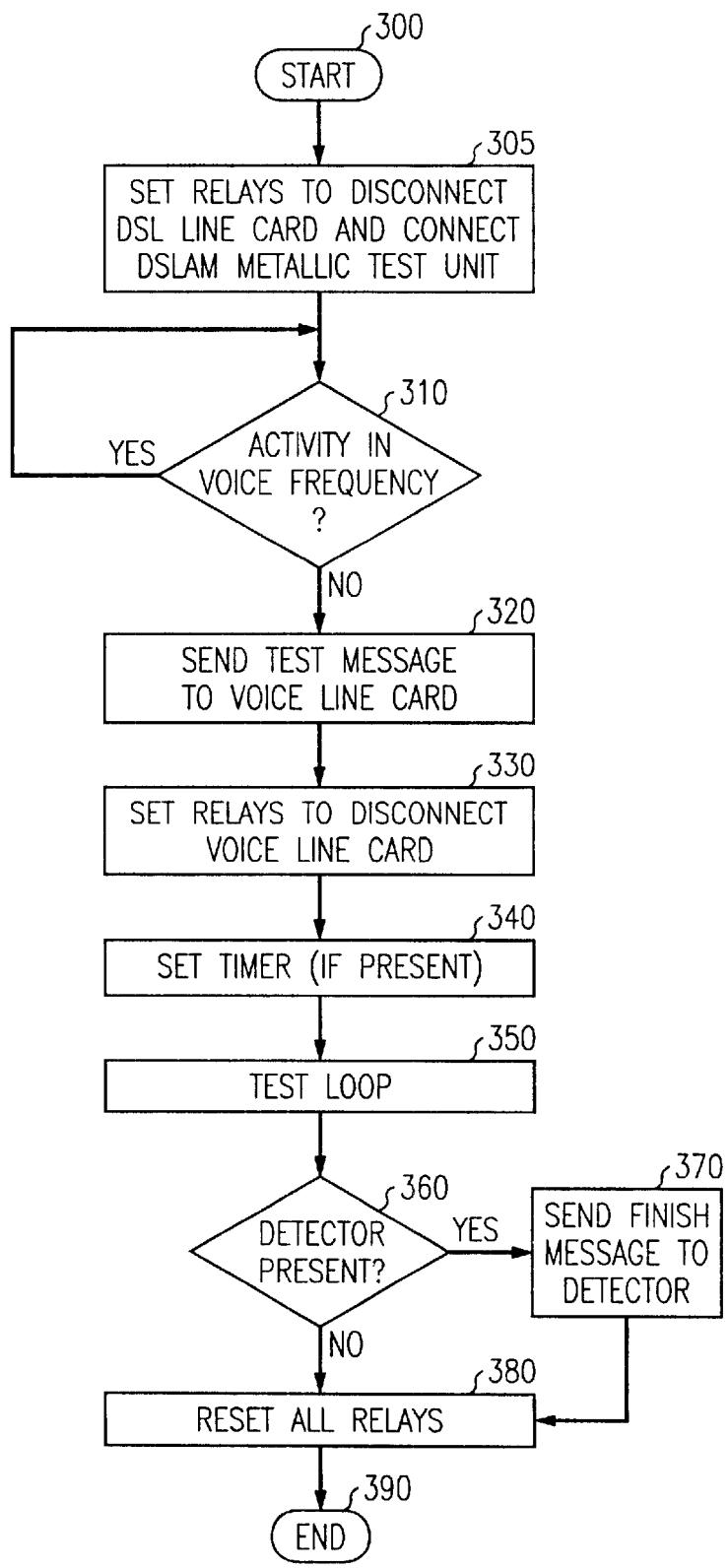
FIG. 3 is a flowchart of operation in the voice metallic test system in the context of FIG. 2.

Turning now to FIG. 3, a flowchart is shown for control of DSLAM metallic unit 258 testing tip-ring pair 22. Processing starts in oval 300 and proceeds to action box 305 wherein processor 256 causes relay pairs 250 and 252 to open normally closed relay 254 and close normally opened relay 256, thus disconnecting transceiver 244 from tip-ring pair 22. This action also connects DSLAM metallic test unit 258 to tip-ring pair 22 via metallic test bus 260. Processing then moves to decision diamond 310 where a determination is made whether there is activity in the voice frequency. This step may be accomplished by sending a signal from DSLAM metallic test unit 258 over metallic test bus 260 across tip-ring pair 22 to either a detector 262 or to CODEC 214 via low-pass filter 218 and feed 216. The signal is, in this exemplary embodiment, a 10–16 kHz AC signal (between the voice and the XDSL band). Other frequency AC or DC signals may also be used. The AC signal is received and processor 228 notified that the DSLAM metallic test unit 258 wants to test loop 22. This signal is detected either by detector 262, CODEC 214 or feed 216. Processor 228 then queries CODEC 214 to determine if speech is currently being processed. Alternatively, detector 262 or even DSLAM metallic test unit 258 may determine whether there is energy on tip-ring pair 22 in the voice frequency range that is above a predetermined threshold. A response is sent back to DSLAM metallic test unit 258 from detector 262 or CODEC 214 via tip-ring pair 22 and metallic bus 260. If there is activity in the voice then metallic testing is deferred until the activity has cleared.

If there is not activity in the voice frequency range, as determined in decision diamond 310, then a test message is sent to the voice line card 320. Again, this test message may be in the band between voice and DSL band, i.e., an AC signal in the 10–16 kHz range. Either detector 262 (if present), CODEC 214 or feed 216 informs processor 228 of the presence of this signal. Processor 228 causes relays 220 and 222 to open normally closed relays 224 and close normally opened relays 226 as in step 330. Processing moves to action box 340 where a timer is set in processor 228. Alternatively, no timer need be set if there is a detector 262. In action box 350 DSLAM metallic test unit 258 can test tip-ring pair from "DC to light".

After the test is complete in action box 350, a determination is made in decision diamond 360 whether a detector is present. If a detector is present then a "test concluded" message is sent to detector 262 in action box 370. Detector 262 then causes processor 228 to reset relays in action box 380. Otherwise, when the timer times out processor 228 causes the relays to reset. Processing ends in oval 390.

Figure 4:
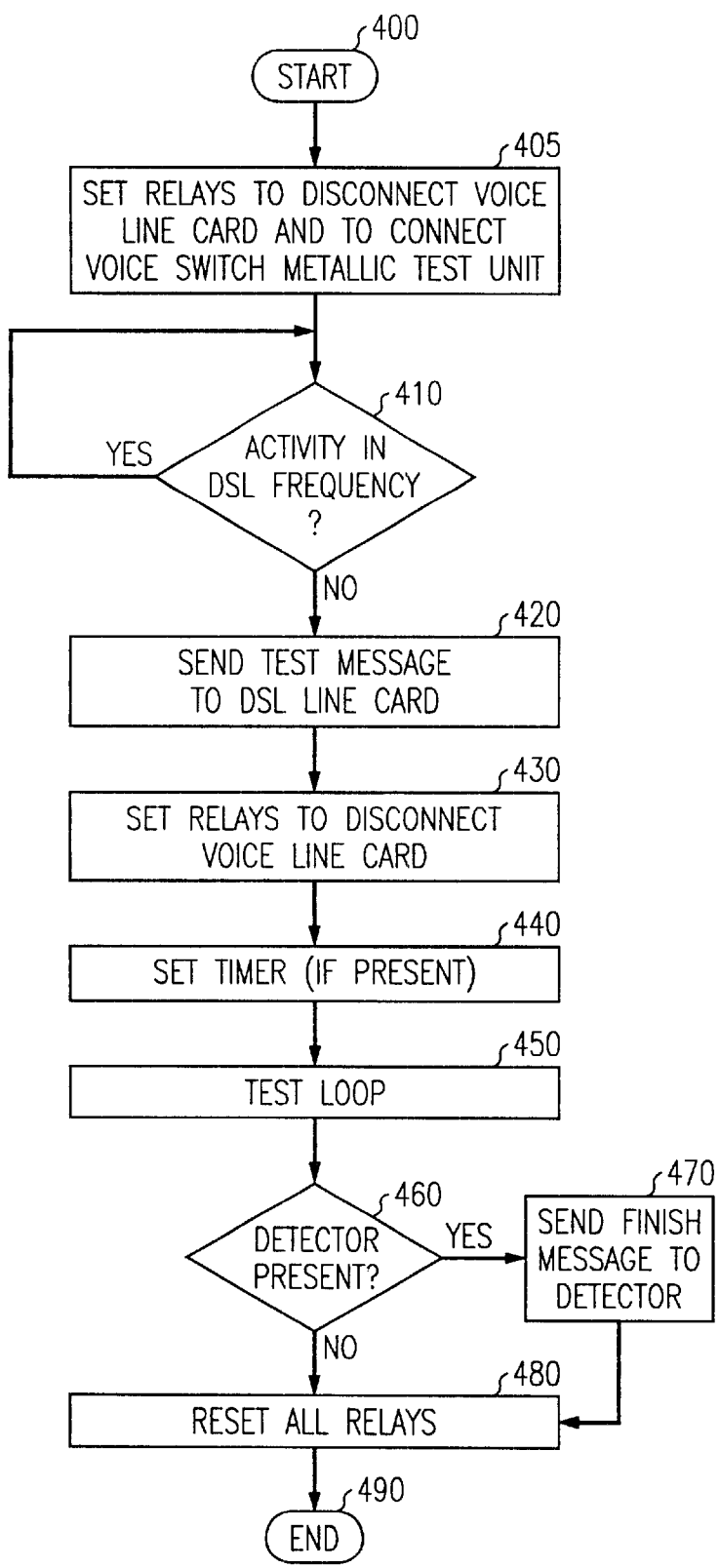
FIG. 4 is a flowchart of operations in an XDSL metallic test system in the context of FIG. 2.

Turning now to FIG. 4, a flowchart of testing from voice switch metallic test unit 208 is shown. This flowchart is very similar to the one shown in FIG. 3. Processing starts in oval 400 and proceeds to action box 405 wherein processor 228 causes relay pairs 220 and 222 to open normally closed relay 224 and close normally open relays 226, thus disconnecting lowpass filter 218, and the other circuits on DSL-ready line card 204 from tip-ring pair 22. Further, this action connects voice switch metallic test unit 208 to the loop (tip-ring pair)

22 via metallic test bus 210. Processing then moves to decision diamond 410 where a determination is made whether there is activity in the DSL. This step may be accomplished by sending a signal across tip-ring pair 22 either to detector 264 or to transceiver 244. This may be accomplished by sending a signal in the 10–16 kHz AC range that is between the voice and the XDSL band. Processor 256 then queries transceiver 244 to determine if DSL activity is present (anything other than idle code, in this exemplary embodiment) or, alternatively, detector 264 can determine if there is energy above a predetermined threshold on tip-ring pair 22 in the DSL frequency range. A response is sent back to voice switch metallic test unit 208. If there is activity in the DSL band then processing waits until the activity has cleared. Alternatively, voice switch metallic test unit 208 could determine whether DSL traffic is present on loop 22.

If there is not activity in the DSL band as determined in decision diamond 410, then a test message is sent to the DSL line card 240. Again, this test message may be an AC signal in the 10–16 kHz range. Either detector 264 or transceiver 244 informs processor 256 of the presence of this signal. Processor 256 causes relays 250 and 252 to open normally closed relays 254 and close normally opened relays 256 as in step 430. Processing moves to action box 440 where a timer is set in processor 256 (if the timer is present). Alternatively, no timer need be set if there is a detector 264. In action box 450 voice switch metallic test unit 208 can test tip-ring from "DC to light".

After the test is complete in action box 450, a determination is made in decision diamond 460 whether a detector is present. If a detector is present then a "test concluded" message is sent to detector 264 in action box 470. Detector 264 then causes processor 256 to reset relays in action box 480. Otherwise, when the timer times out processor 256 causes the relays to reset. Processing ends in oval 490.

It is to be understood that the above-described embodiment is merely an illustrative principle of the invention and that many variations may be devised by those skilled in the art without departing from the scope of the invention. It is, therefore, intended that such variations be included within the scope of the appended claims.

What is claimed is:

1. A system to effect metallic testing of a subscriber loop served by a voice switch and a DSL switch, said system comprising:
   a voice frequency line card having a connection to a first metallic test bus via a first set of relays configured to connect the metallic test bus to said subscriber loop and to disconnect said subscriber loop from a voice band circuit;
   a DSL line card having a connection to a second metallic test bus via a second set of relays configured to connect the metallic test bus to said subscriber loop and to disconnect said subscriber loop from a DSL circuit;
   a voice switch metallic test system connected to said first metallic bus via said first relay and configured to send signals to control said second relay and to provide metallic tests over the entire wireline spectrum; and
   a DSL metallic test system connected to said second metallic bus via said first relay and configured to send signals to control said first relay and to provide metallic tests over the entire wireline spectrum.

2. A system in accordance with claim 1 wherein said voice frequency line card comprises a DSL ready POTS line card.

3. A system in accordance with claim 1 wherein said voice frequency line card comprises a DSL-ready ISDN line card.

4. A system in accordance with claim 1 wherein said voice frequency line card includes a detector configured to cause said first set of relays to operate.

5. A system in accordance with claim 1 wherein said DSL line card includes a detector configured to cause said second set of relays to operate.

6. A system in accordance with claim 1 further including signaling means in said voice switch for notifying said DSL line card when said voice metallic test system desires testing of said subscriber loop.

7. A system in accordance with claim 1 further including signaling means in said DSL switch for notifying said voice line card when said DSL metallic test system desires testing of said subscriber loop.

8. A system in accordance with claim 1 further including means for detecting whether voice signals are present prior to said DSL metallic test system testing said loop.

9. A system in accordance with claim 1 further including means for detecting whether DSL signals are present prior to said voice metallic test system testing said loop.

10. A system in accordance with claim 1 wherein said metallic tests over the entire wireline spectrum comprises metallic test from DC to light.

11. A method for testing a subscriber loop that is connected to both a voice line card in a voice switch and a DSL line card in a DSL switch from a metallic test unit in said voice switch, said method comprising:
   disconnecting said voice line card from said subscriber loop;
   connecting said voice switch metallic test unit to said subscriber loop;
   sending a test message to said DSL line card;
   disconnecting said subscriber loop from said DSL line card responsive to said test message;
   testing said subscriber loop by said voice switch metallic test unit;
   reconnecting said DSL line card; and
   reconnecting said voice line card.

12. A method in accordance with claim 11 further including the step of determining whether there is activity in said DSL frequency on said subscriber loop; and said step of sending a test message to said DSL line card is responsive to determining that there is no activity in said DSL frequency.

13. A method in accordance with claim 11 wherein said step of sending a test message to said DSL line card comprises generating a signal in a frequency range between an operational frequency range of said voice line card and an operational frequency of said DSL line card.

14. A method in accordance with claim 13 wherein said step of generating a signal comprises generating an AC signal in the frequency range of 10–16 kHz.

15. A method in accordance with claim 11 further including the step of setting a timer prior to said step of testing said subscriber loop, and said steps of reconnecting said DSL line card and reconnecting said voice line card are responsive to expiration of said timer.

16. A method for testing a subscriber loop that is connected to both a voice line card in a voice switch and a DSL line card in a DSL switch from a metallic test unit in said DSL switch, said method comprising:
   disconnecting said DSL line card from said subscriber loop;
   connecting said DSL switch metallic test unit to said subscriber loop;
   sending a test message to said voice line card;

disconnecting said subscriber loop from said voice line card responsive to said test message;

testing said subscriber loop by said DSL switch metallic test unit;

reconnecting said voice line card; and reconnecting said DSL line card.

17. A method in accordance with claim 16 further including the step of determining whether there is activity in said voice frequency on said subscriber loop; and said step of sending a test message to said voice line card is responsive to determining that there is no activity in said voice frequency.

18. A method in accordance with claim 16 wherein said step of sending a test message to said voice line card comprises generating a signal in a frequency range between an operational frequency range of said voice line card and an operational frequency of said DSL line card.

19. A method in accordance with claim 18 wherein said step of generating a signal comprises generating an AC signal in the frequency range of 10–16 kHz.

20. A method in accordance with claim 16 further including the step of setting a timer prior to said step of testing said subscriber loop, and said steps of reconnecting said DSL line card and reconnecting said voice line card are responsive to expiration of said timer.

* * * * *